US009631738B2

(12) United States Patent
Schroeder

(10) Patent No.: US 9,631,738 B2
(45) Date of Patent: Apr. 25, 2017

(54) GUIDING DEFORMATION IN SEATED HYDRAULIC METERING DEVICES

(71) Applicant: Eaton Corporation, Cleveland, OH (US)

(72) Inventor: Kyle William Schroeder, St Paul, MN (US)

(73) Assignee: Eaton Corporation, Cleveland, OH (US)

( * ) Notice: Subject to any disclaimer, the term of this patent is extended or adjusted under 35 U.S.C. 154(b) by 241 days.

(21) Appl. No.: 13/739,187

(22) Filed: Jan. 11, 2013

(65) Prior Publication Data

US 2013/0187068 A1 Jul. 25, 2013

Related U.S. Application Data

(60) Provisional application No. 61/587,021, filed on Jan. 16, 2012.

(51) Int. Cl.
*F16K 31/40* (2006.01)
*F16K 31/12* (2006.01)
*F16K 1/38* (2006.01)

(52) U.S. Cl.
CPC .............. *F16K 31/12* (2013.01); *F16K 1/385* (2013.01); *F16K 31/406* (2013.01); *Y10T 29/49405* (2015.01)

(58) Field of Classification Search
CPC . F16K 1/42; F16K 1/425; F16K 25/00; F16K 29/00; F16K 31/423; F16K 31/12; F16K 1/385
USPC ...... 251/30.01, 30.02, 30.05, 282, 324, 325, 251/333, 334, 359
See application file for complete search history.

(56) References Cited

U.S. PATENT DOCUMENTS 1,756,337 A * 4/1930 Bowler .................... 123/188.8
3,054,422 A * 9/1962 Napolitano ............. F16K 1/385
                                                      137/509
3,174,718 A * 3/1965 Bowen ..................... F16K 1/34
                                                      251/334

(Continued)

FOREIGN PATENT DOCUMENTS

GB        1149864        4/1969
KR    10-1035101 B1      5/2011
WO   WO 2009/005425 A1   1/2009

OTHER PUBLICATIONS

International Search Report and Written Opinion for PCT/US2013/021181 mailed Apr. 17, 2013.

(Continued)

*Primary Examiner* — Matthew W Jellett
(74) *Attorney, Agent, or Firm* — Merchant & Gould, P.C.

(57) ABSTRACT

A hydraulic valve arrangement includes a manifold and a poppet. The manifold defines a bleed ring that surrounds a bore and has an angled surface. The manifold also defines an annular recess around the bleed ring that provides a relief region. The poppet is slidably disposed within the bore and is structured to close a main flow path between the first and second ports when the poppet is in a first position and the poppet being structured to at least partially open the main flow path when the poppet slides away from the first position. The poppet defines an angled contact surface that is configured to engage the angled contact surface of the bleed ring when the poppet is in the first position.

23 Claims, 8 Drawing Sheets

(56) References Cited

U.S. PATENT DOCUMENTS

| | | | | |
|---|---|---|---|---|
| 5,423,348 | A * | 6/1995 | Jezek | B05B 1/3013 |
| | | | | 137/454.6 |
| 5,657,961 | A * | 8/1997 | Kalsi | F16K 3/314 |
| | | | | 251/324 |
| 5,884,705 | A * | 3/1999 | Hill, Jr. | 166/324 |
| 6,237,893 | B1 * | 5/2001 | Rose | F16K 15/063 |
| | | | | 251/323 |
| 6,257,268 | B1 * | 7/2001 | Hope | G05D 16/103 |
| | | | | 137/111 |
| 7,108,244 | B2 * | 9/2006 | Hardin | 251/333 |
| 8,006,715 | B2 * | 8/2011 | Shafer et al. | 137/375 |
| 8,684,037 | B2 * | 4/2014 | Huynh | 137/625.4 |
| 2002/0157529 | A1 * | 10/2002 | Kariya et al. | 91/461 |
| 2005/0242310 | A1 * | 11/2005 | Takiguchi et al. | 251/28 |

OTHER PUBLICATIONS

Valvistor Proportional Flow Control Cartridge Valves, Eaton Corporation, 16 pages (Apr. 2009).

* cited by examiner

GUIDING DEFORMATION IN SEATED HYDRAULIC METERING DEVICES

CROSS REFERENCE TO RELATED APPLICATIONS

This application claims the benefit of U.S. Provisional Application No. 61/587,021, filed Jan. 16, 2012, and titled "Guiding Deformation in Seated Hydraulic Metering Devices," the disclosure of which is hereby incorporated herein by reference.

BACKGROUND

Certain types of valve arrangements (e.g., valve manifolds, cartridge valves, etc.) use a self-regulating hydraulic circuit design for the control of flow rate by a current-controlled signal. This circuit design (also known as a Valvistor® design) achieves servo-type control of a main poppet without using an electrical feedback transducer. In particular, the main poppet amplifies a small flow through a pilot circuit, comparable to a transistor. Such valve arrangements may be used in a wide range of applications with hydraulic cylinders and motors. Non-limiting examples of such applications include casting, deep drawn presses, injection molding, container handling, shovel loaders, forestry, and dump trucks.

FIGS. 1-3 show the construction of conventional valve arrangements using self-regulating hydraulic circuit designs. FIG. 1 is a cross-sectional view of a valve arrangement 100 including a system chamber 102 and a pilot chamber 104. The system chamber 102 includes a manifold 110 and a poppet 120. The pilot chamber 104 includes a pilot valve 130. In general, the system chamber 102 defines a main flow circuit and the pilot chamber 104 at least partially defines a pilot flow circuit.

The manifold 110 defines a first opening 111 that leads to an internal bore 113. The manifold 110 also defines a second opening 114 that leads to the internal bore 113 to form a main flow path. In the example shown, the first opening 111 defines a first port P1 and the second opening 114 defines a second port P2. Each port P1, P2 may function as an inlet and/or an outlet for fluid flow. The inlet receives fluid having system pressure and the outlet leads to the reservoir tank. In the example shown, the second opening 114 is oriented generally orthogonal to the first opening 111 and the first passage 116.

The manifold 110 also defines a variable volume region 117 at an opposite end of the bore 113 from the first opening 111. A passage 116 leads from the variable volume region 117 to the pilot chamber 104. The pilot valve 130 selectively directs fluid received from the passage 116 to a second passage 118 that leads to the second port P2 of the manifold 110 as will be described in more detail herein. The variable volume region 117, passage 116, and second passage 118 form a second flow path.

The poppet 120 is configured to slide within the bore 113 of the manifold 110 along first and second directions A1 and A2. The poppet 120 generally divides the manifold 110 into a first section defining the main fluid circuit and a second section defining the second fluid circuit. The volume of the region 117 varies as the poppet 120 slides within the bore 113 in the first and second directions A1, A2. Movement of the poppet 120 in the first direction A1 opens the main fluid circuit between the first and second ports P1, P2 and reduces the volume of the region 117. Movement of the poppet 120 in the second direction A2 closes the main fluid circuit and enlarges the volume of the region 117.

In certain implementations, the manifold 110 includes an angled seat 112 against which an angled contact surface 123 of the poppet 120 may be pressed to close the main fluid circuit. Engagement between the contact surface 123 and the angled seat 112 forms a seal between the first and second ports P1, P2. When the poppet 120 opens the main fluid circuit, fluid flows from the first port P1, past the angled seat 112, to the second port P2. Movement of the poppet 120 in the first direction A1 moves the contact surface 123 of the poppet 120 away from the seat 112 of the manifold 110 and movement of the poppet 120 in the second direction A2 moves the contact surface 123 towards from the seat 112.

As shown in FIGS. 1 and 2, the poppet 120 includes a body 121 having a top 125 and a bottom 126. In the example shown, the body 121 also has one or more annular side surfaces that extend between the top 125 and bottom 126 of the poppet 120. In other implementations, the sides of the poppet 120 may define any desires shape. The body 121 defines a through-channel 122 extending from the bottom 126 of the poppet body 121 to an orifice 124 defined in the annular side surface of the poppet body 121 towards the top 125 of the body 121. In the example shown, the orifice 124 is an elongated slit. In other implementations, the orifice 124 may be any desired shape.

When the poppet 120 is disposed in the manifold 110, the bottom 126 of the body 121 faces the first opening 111 of the manifold 110 and the top 125 of the body 121 faces the variable volume region 117. The poppet body 121 and the manifold bore 113 are sized and shaped so that the orifice 124 of the poppet 120 is at least mostly covered by an inner surface of the bore 113 when the poppet 120 is in a seated position (i.e., when the poppet contact surface 123 engages the manifold seat 112). The poppet body 121 and manifold bore 113 are further sized and shaped so that the orifice 124 is increasingly exposed to the variable volume region 117 as the poppet 120 moves away from the manifold seat 112 in the first direction A1.

The pilot valve 130 includes a proportional two-position valve having an inlet 132 and an outlet 134. The inlet 132 is in fluid communication with the variable volume region 117. The outlet 134 is in fluid communication with the manifold passage 118. Movement of the pilot valve 130 is electrically controlled (e.g., by a proportional solenoid). When the pilot valve 130 is in the first position, the inlet 132 is isolated from the outlet 134. As the pilot valve 130 moves towards the second position, the second fluid path is increasingly opened between the inlet 132 and the outlet 134.

Fluid entering the manifold 110 through the first port P1 pushes against the bottom 126 of the poppet 120 in the first direction A1. Fluid located in the variable volume region 117 applies pressure to the top 125 of the poppet 120 in the second direction A2. The poppet 120 is held in a stationary position within the bore 113 when the pressure within the region 117 is in equilibrium to the pressure of the fluid at the first port P1. When the pilot valve 130 is closed, the fluid in the region 117 remains in the region and the poppet 120 is maintained in position. In certain implementations, a sufficient amount of the metering orifice 124 is exposed to enable some fluid to pass through the passage 122 from the inlet 111, through the metering orifice 124, to the region 117 to maintain equilibrium.

When the pilot valve 130 opens, fluid flows from the variable volume region 117 through the passage 116, through the open pilot valve 130, and to the second passage 118. The reduction is fluid reduces the pressure within the region 117 until the system pressure (i.e., the pressure of the fluid at the inlet 111) is sufficient to move the poppet 120 in the first direction A1. As the poppet rises, fluid flows from the first port P1 to the second port P2. In addition, fluid flows from the first port P1, through the passage 122, through the metering orifice 124, and into the region 117. When the poppet 120 rises enough to allow sufficient fluid to enter the region 117 to offset the loss to the tank, the pressure within the region 117 will begin increasing until equilibrium is restored, thereby holding the poppet in a stable raised position.

As shown in FIG. 3, the inlet and outlet of the valve arrangement 100 may be reversed by substituting the poppet 120 for another poppet 120' and by routing the fluid path 118 past the second opening 114 to the first opening 111. The second example poppet 120' shown in FIG. 3 defines a passage 122' having a first end that aligns with the second opening 114 and a second end that defines a variable orifice 124 towards the top of the poppet 120'. The passage 122' is sized and structured so that fluid from the second opening 114 flows to the variable volume region 117 until equilibrium is reached between the system pressure and the pilot pressure in substantially the same way as described above.

Improvements to valve arrangements having self-regulating hydraulic circuit designs are desired.

SUMMARY

One aspect of the present disclosure relates to a hydraulic valve arrangement including a system chamber including a manifold and a poppet. The manifold defines a first port and a second port leading to a bore. The manifold also defines a bleed ring that surrounds the bore and has an angled surface. The manifold also defines an annular recess around the bleed ring. The annular recess has an inner radius that is radially spaced outwardly from the bore a first distance and has an outer radius that is radially spaced outwardly from the bore a second distance that is greater than the first distance. The poppet is slidably disposed within the bore between a plurality of positions. The poppet is structured to close a main flow path between the first and second ports when the poppet is in a first position and the poppet being structured to at least partially open the main flow path when the poppet slides away from the first position. The poppet defines an angled contact surface that is configured to engage the angled contact surface of the bleed ring when the poppet is in the first position.

Another aspect of this disclosure relates to a valve manifold for use with a poppet to selectively open a fluid pathway between a first port and a second port. The valve manifold includes a body defining a first opening and a second opening connected through an internal bore. The second opening is not axially aligned with the first opening. The internal bore defines a first section having a first radius and a second section having a second radius that is smaller than the first radius. The body defines a bleed surface, which defines an annular recess around the bore. The annular recess has a depth that extends along an axis of the internal bore and the annular recess having an inner radius that is spaced at a radial offset from the bore to provide a bleed ring. The bleed ring is located between the first and second sections of the bore. The bleed ring has an angled contact surface facing towards the bore. In certain implementations, the annular recess has a depth that is greater than a height of the angled contact surface.

A method of guiding deformation of a valve manifold includes determining a minimum wall thickness needed to support a contact surface of the valve manifold based on a first material from which the bleed surface is formed, a force at which a poppet is to strike the contact surface, and a number of use cycles. The method also includes removing material from a bleed surface of the valve manifold to form an annular recess having a depth that extends parallel with an internal bore and having an internal radius that is spaced from the internal bore by a radial offset to provide a bleed ring around the radial bore. The radial offset is selected based on the determined minimum wall thickness. The contact surface is defined by the bleed ring and tapers outwardly from the internal bore.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 4:
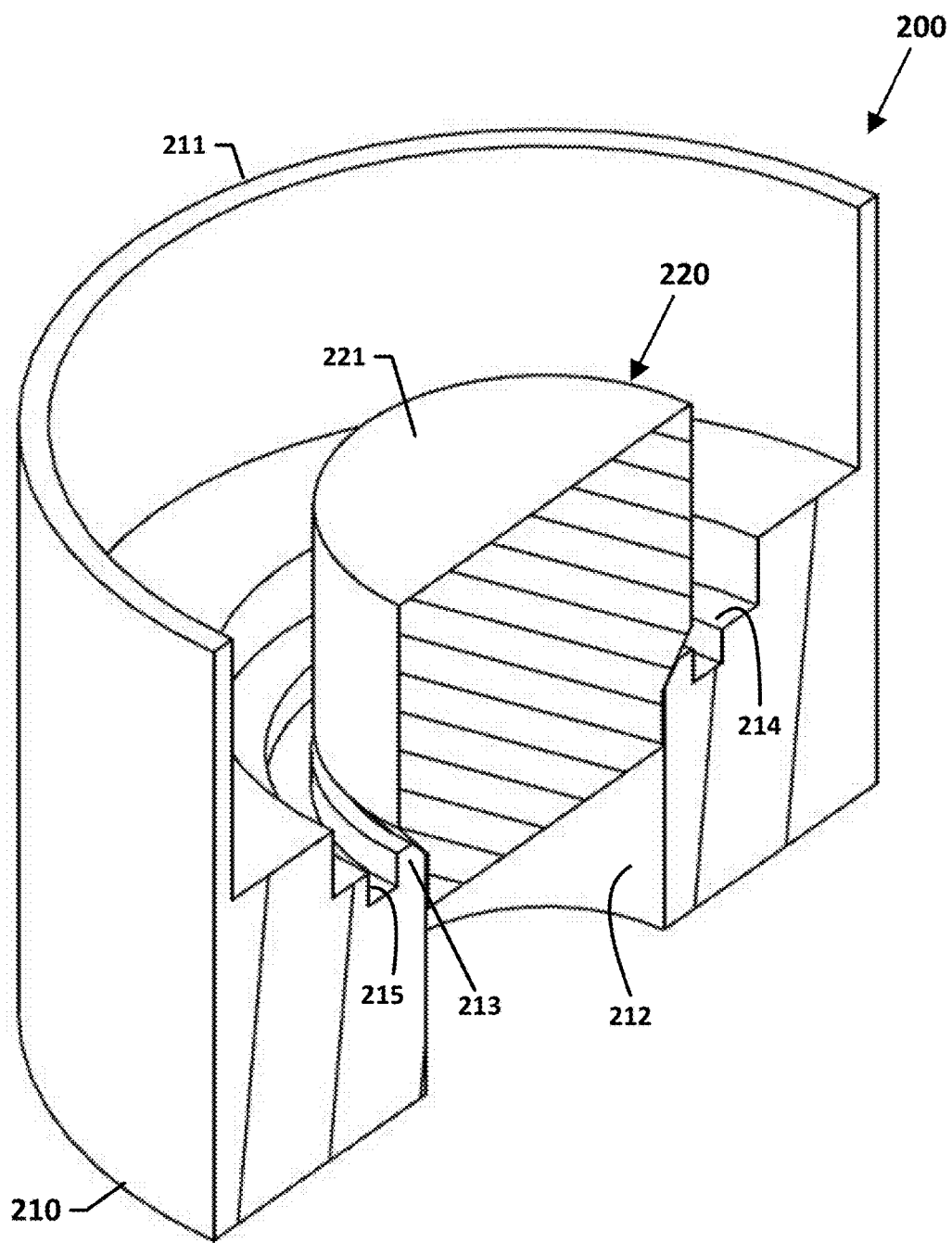
FIG. 4 is a schematic diagram of a cross-section of a poppet and a cross-section of a portion of a manifold of an example valve arrangement shown in perspective, the valve arrangement being structured and configured in accordance with the principles of the disclosure.
Figure 5:
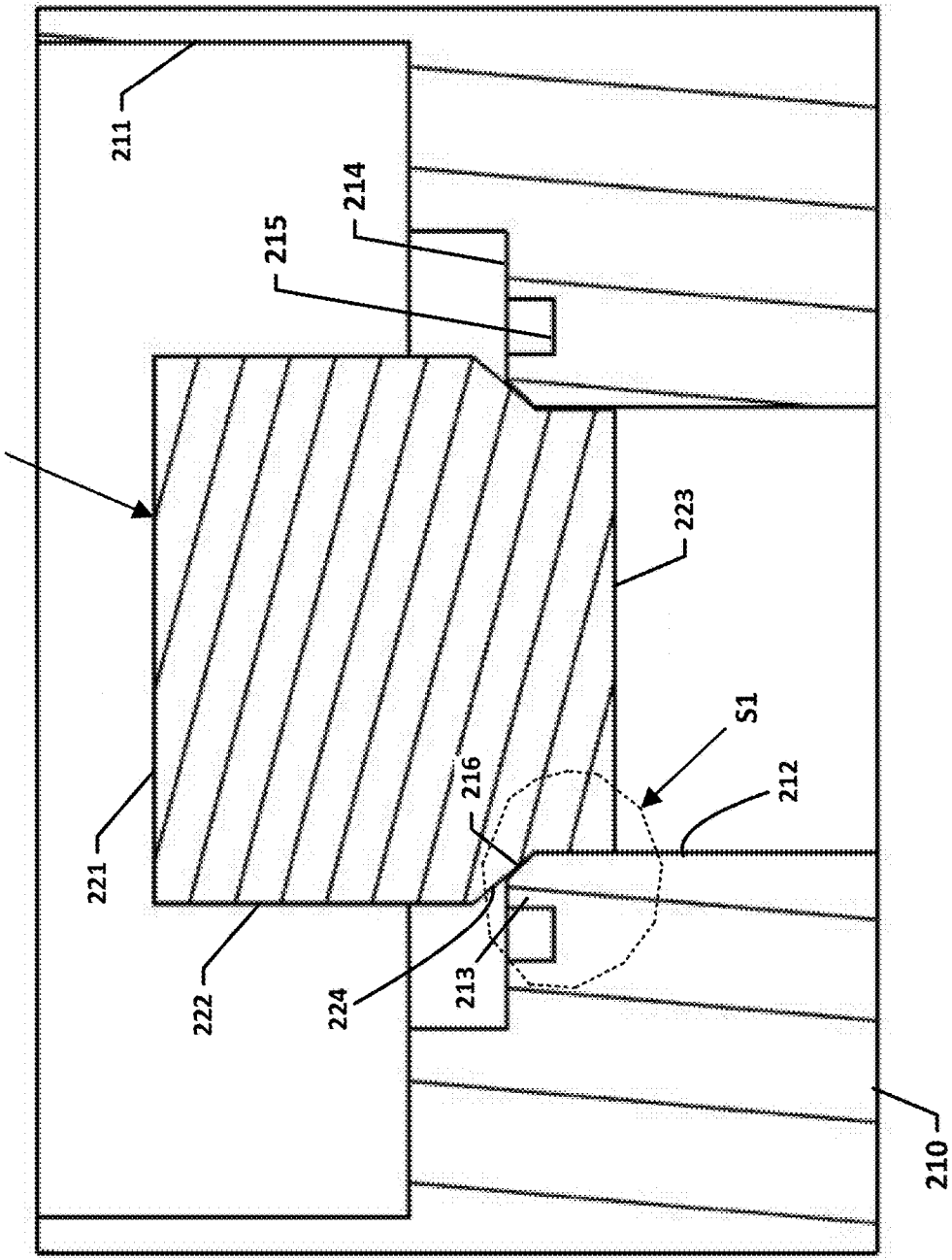
FIG. 5 is a cross-sectional view of the poppet and manifold portion shown in FIG. 4.
Figure 6:
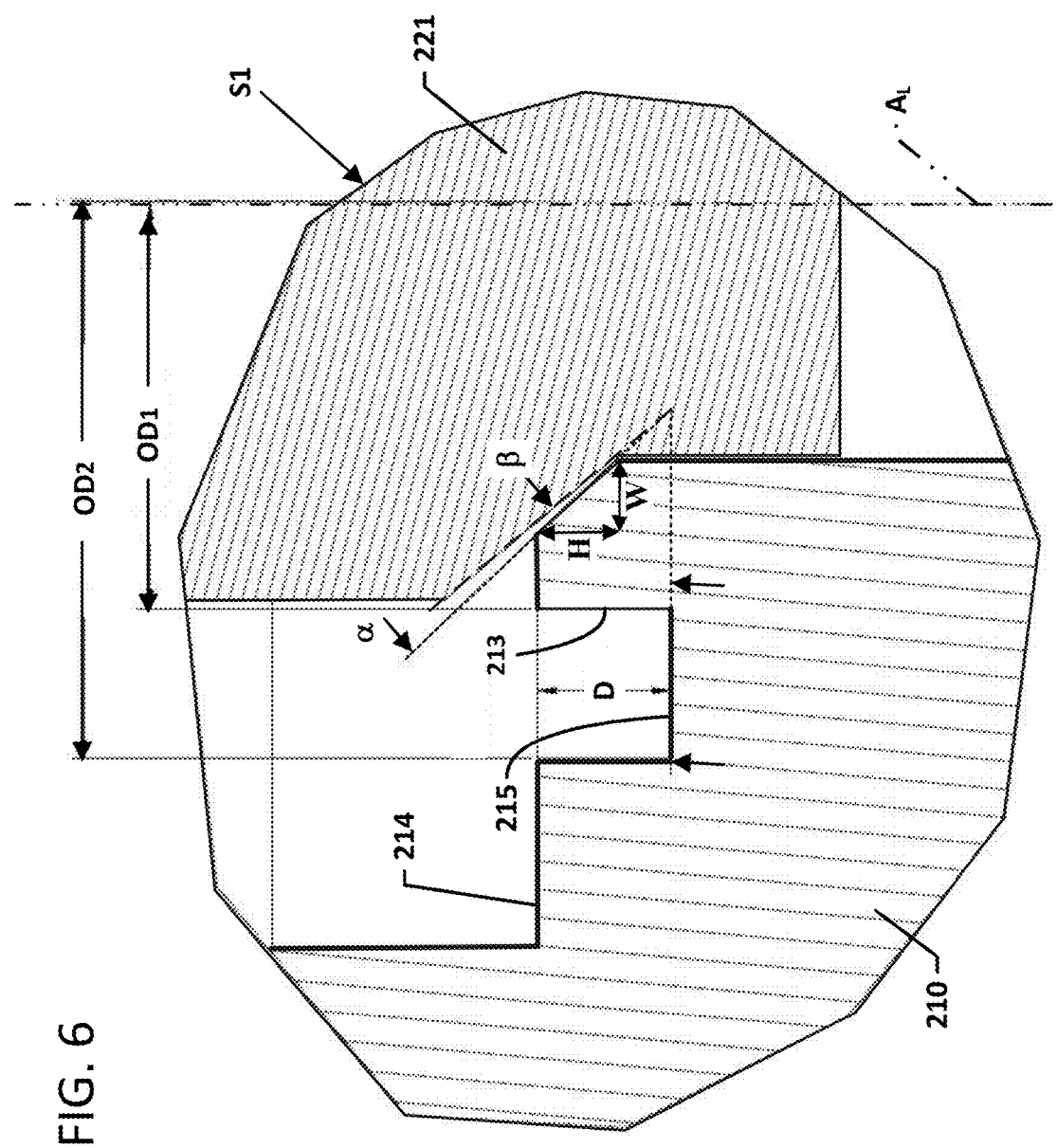
FIG. 6 is an enlarged view of a portion of the manifold and poppet shown in FIG. 5.

FIGS. 4-6 illustrate a portion of an example valve arrangement 200 including a manifold 210 and a poppet 220. The manifold 210 defines a main flow path through which hydraulic fluid may flow between a first port and a second port. The poppet 220 slides within the manifold 210 to selectively close and open the main fluid path. In certain implementations, the bore 212 of the manifold 210 has at least a main section and a reduced diameter section. A body 221 of the poppet 220 also includes a main section 222 and a nose 223. The poppet 220 is sized so that the poppet main section 222 is disposed within the main section of the bore 212 and the nose 223 selectively enters the reduced diameter section of the bore 212 to open and close the main fluid path.

For ease in viewing, not all of the features of the manifold 210 and poppet 220 are shown. For example, only a section of the manifold 210 including the reduced diameter section of a bore 212, a bleed surface 214, and an angled contact surface 216 are shown. The main section of the bore 212 that contacts the side surface of the poppet 220 is not shown. The first port is defined by the bottom of the reduced diameter section of the bore 212. A second port may be defined at an opposite side of the bleed surface 214 and contact surface 216 from the bore 212. For example, the second port may be defined in a side wall 211 of the manifold 210.

In certain implementations, the second port is not aligned with the first port. For example, the first port may face a bottom of the poppet 220 and the second port may face a side surface of the poppet 220. In other implementations, the second port is located opposite the first port. In certain implementations, the first port defines a fluid inlet of a main fluid path and the second port defines a fluid outlet of the main fluid path. In certain implementations, the first port defines a fluid outlet of the main fluid path and the second port defines a fluid inlet of the main fluid path.

The bleed surface 214 of the manifold 210 is defined between the main section of the bore 212 and the reduced diameter section of the bore 212. In certain implementations, the bleed surface 214 is oriented generally orthogonally to the bore 212. The bleed surface 214 is located within the manifold 210 so that hydraulic fluid flows over the bleed surface 214 when the fluid flows between the first and second ports. A contact surface 216 extends at an angle between the bleed surface 214 and the reduced diameter section of the bore 212. The contact surface 216 has a height H and a width W (see FIG. 6). In some implementations, the contact surface 216 extends at an angle α ranging from 45° to about 60°. In one example implementations, the contact surface 216 extends at an angle α of about 50°.

An annular recess 215 is defined in the bleed surface 214 to form a bleed ring 213 around the bore 212. The bleed ring 213 defines the angled contact surface 216. The annular recess 215 provides a relief region into which material from the bleed ring 213 may spread when deformed by the poppet 220. In some implementations, the annular recess 215 is drilled into the bleed surface 214 of the manifold. In other implementations, the annular recess 215 may be cut into the bleed surface 214. In still other implementations, the annular recess 215 may be etched into the bleed surface 214. In still other implementations, material may be removed from the bleed surface 214 by a laser to form the annular recess 215. In other implementations, the annular recess 215 may be otherwise formed in the bleed surface 214.

In some implementations, the annular recess 215 has a depth D (FIG. 6) that is greater than the height H of the angled contact surface 216 of the bleed ring 213. In some implementations, the depth D of the annular recess 215 ranges from about 0.02 inches to about 0.15 inches. In certain implementations, the depth D of the annular recess 215 ranges from about 0.025 inches to about 0.12 inches. In one example implementation, the depth D of the annular recess is about 0.025 inches. In another example implementation, the depth D of the annular recess is about 0.05 inches.

The bleed ring 213 has an outer radius $OD_1$ that is radially spaced outwardly from a longitudinal axis $A_L$ of the bore 212 by a first distance. The annular ring 215 has an outer radius $OD_2$ that is radially spaced outwardly from the longitudinal axis $A_L$ of the bore 212 by a second distance that is greater than the first distance (FIG. 6). The outer radius $OD_1$ of the bleed ring 213 is selected to provide a sufficient wall thickness to inhibit creating stress concentrations in the bleed ring 213. The outer radius $OD_2$ of the annular recess 215 is selected to facilitate formation of the annular recess 215 and to provide a sufficient volume for a relief region to accommodate deformation of the bleed ring 213.

In some implementations, the outer radius $OD_1$ of the bleed ring 213 ranges from about 1.2 inches to about 1.5 inches. In certain implementations, the outer radius $OD_1$ of the bleed ring 213 ranges from about 1.3 inches to about 1.4 inches. In one example implementation, the outer radius $OD_1$ of the bleed ring 215 is about 1.35 inches. In some implementations, the outer radius $OD_2$ of the annular recess 215 ranges from about 1.4 inches to about 1.7 inches. In one example implementation, the outer radius $OD_2$ of the annular recess 215 is about 1.55 inches.

Figure 1:
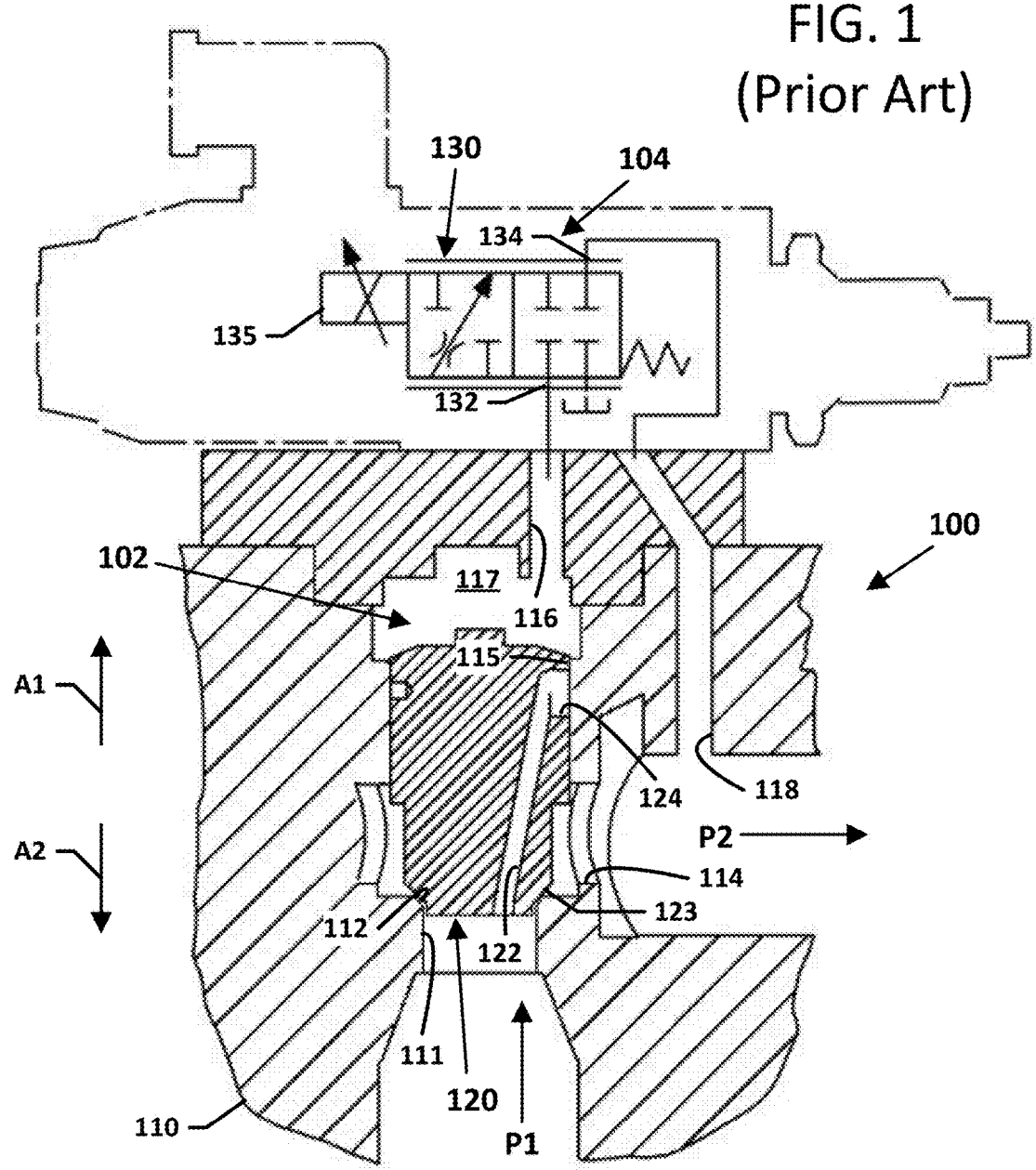
FIG. 1 is a schematic diagram showing a conventional valve arrangement in cross-section, the valve arrangement having a self-regulating hydraulic circuit including a first example poppet defining a through-passage and a pilot valve.
Figure 2:
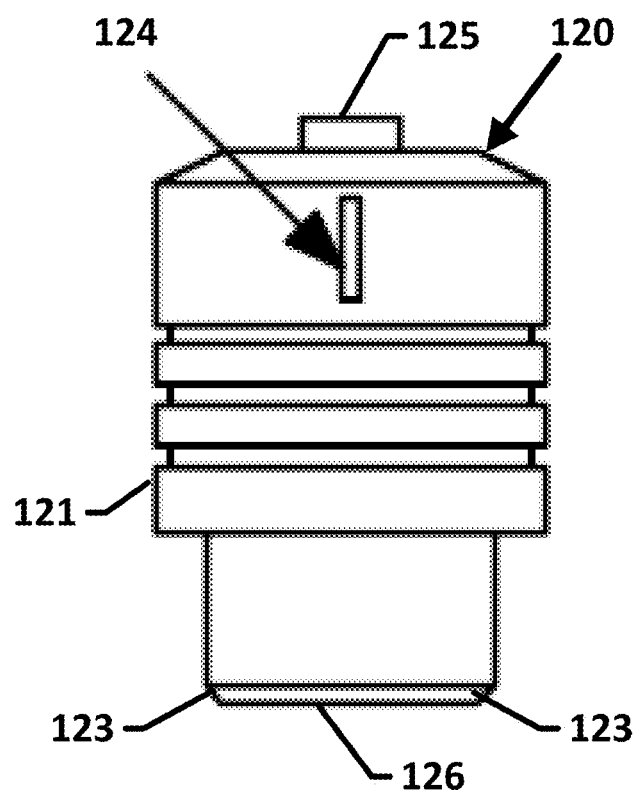
FIG. 2 is a front elevational view of an example poppet suitable for use in any of the valve arrangements disclosed herein.
Figure 3:
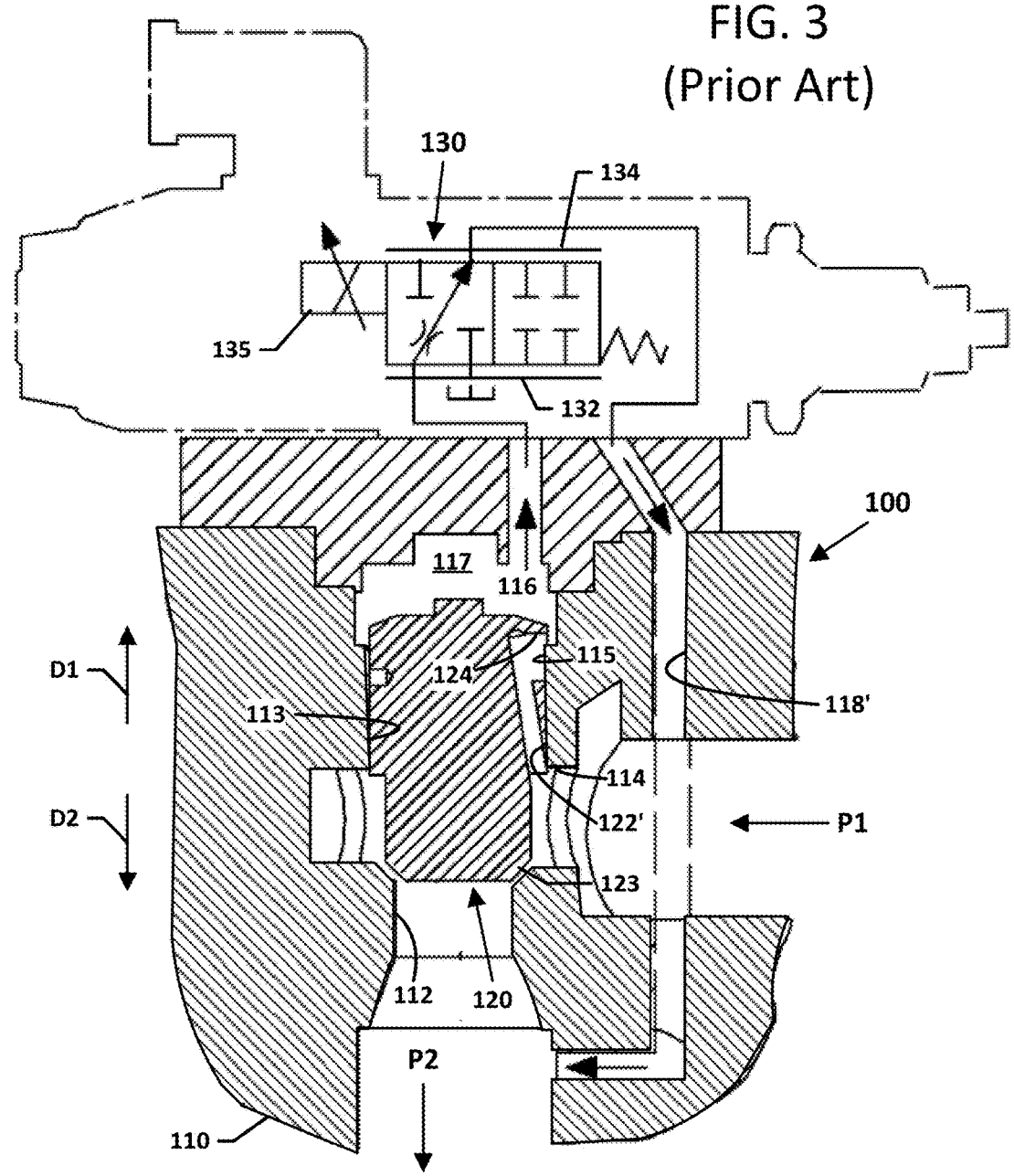
FIG. 3 is a schematic diagram showing a second conventional valve arrangement in cross-section, the second valve arrangement having another self-regulating hydraulic circuit including a second example poppet defining a through-passage and a pilot valve.

In the example shown, the poppet 220 includes a solid body 221 having a main section 222 and a nose 223. The nose 223 has a reduced diameter compared to the main section 222. The nose 223 extends into the reduced diameter section of the bore 212 to enhance the seal between the poppet 220 and the manifold 210. In certain implementations, the nose 223 is taller than the manifold annular recess 215 is deep (e.g., see FIG. 6). In other implementations, however, the poppet body 221 may not include a nose 223. As shown in FIG. 2, the main section 222 of the poppet 220 may have rings, ridges, or other features. In still other implementations, the poppet body 221 may define a passage extending through at least a portion of the body 221 (e.g., see passages 122, 122' in the poppet 120, 120' shown in FIGS. 1 and 3, respectively).

The poppet body 221 defines a contact surface 224 (FIG. 5) that is configured to engage the contact surface 216 of the manifold when the poppet 220 is moved to the closed position. In the example shown, the contact surface 224 of the poppet 220 extends between the main section 222 and the nose 223 of the poppet 220. In certain implementations, the contact surface 224 of the poppet body 221 is longer than the contact surface 216 of the manifold 210.

In some implementations, the contact surface 224 of the poppet body 221 extends at a different angle from the bleed surface 214 (or surface parallel thereto) than the contact surface 216 of the manifold. In certain implementations, the difference in angle ranges from about one degree to about ten degrees. In certain implementations, the difference in angle is no more than about five degrees. In one example implementation, the difference in angle is about five degrees. In one example implementation, the difference in angle is about two degrees.

In operation, the poppet 220 slides within the bore 212 along the longitudinal axis of the bore 212. In certain implementations, the sliding of the poppet is managed by a pilot valve arrangement as described above with respect to FIGS. 1-3. When the poppet 220 moves to close the main flow path within the manifold 210, the contact surface 224 of the poppet 220 engages (i.e., is pressed against) the contact surface 216 of the manifold 210 by a force FP (FIGS. 7-10). Over time, the downward force FP exerted on the manifold contact surface 216 by the poppet contact surface 224 may cause deformation of the manifold contact surface 216, the bleed surface 214, and/or the walls defining the bore 212.

Figure 7:
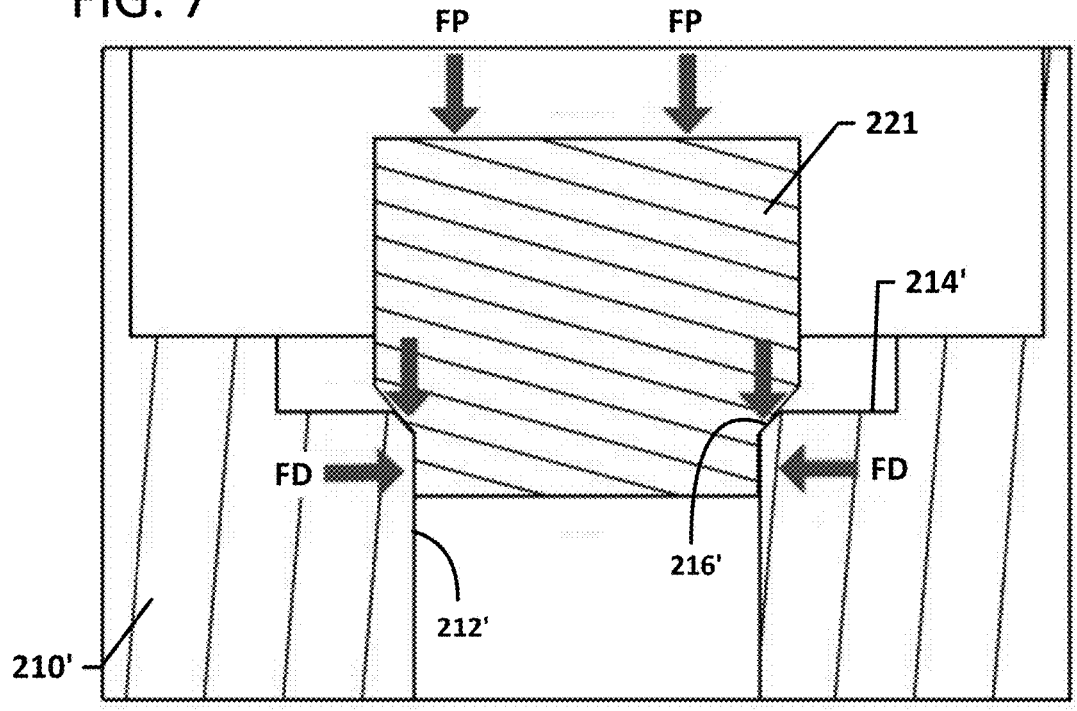
FIGS. 7 and 8 illustrate the deformation effects on a conventional manifold due to pressure exerted by the poppet.
Figure 8:
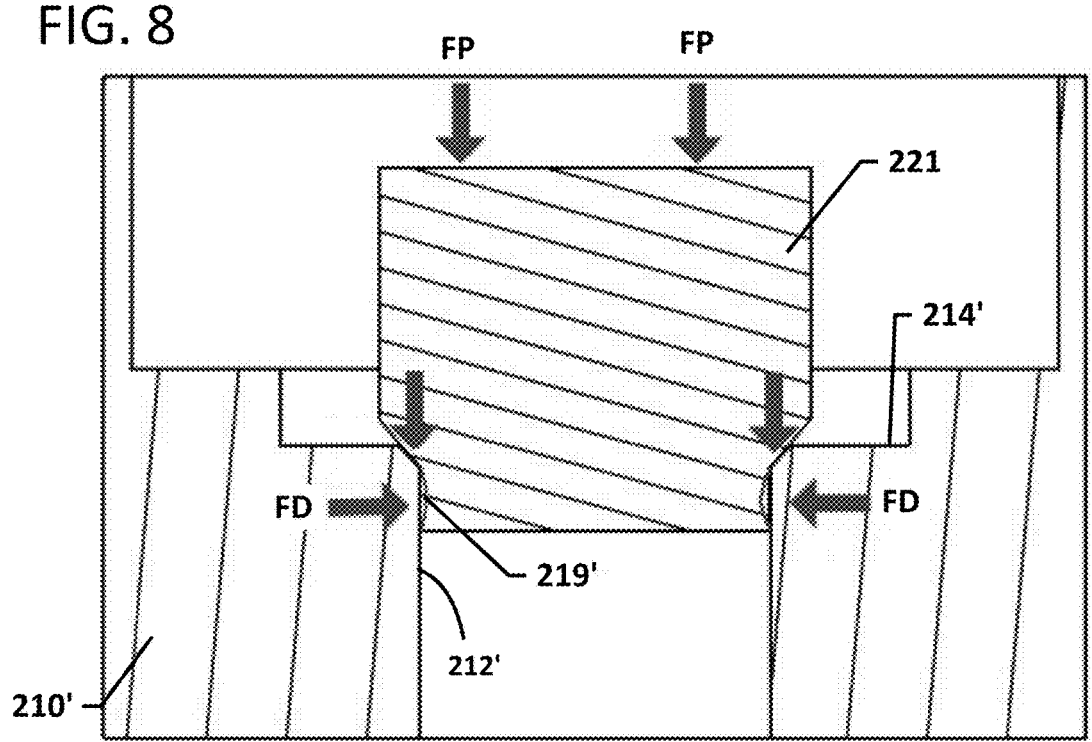

FIGS. 7 and 8 illustrate the effects of this downward force FP on a manifold 210' that does not have a bleed ring 213 and annular recess 215 defined by the bleed surface 214'.

The poppet body 221 applies the downward force FP to the contact surface 216' of the manifold 210'. In certain implementations, the poppet body 221 deforms sufficiently to also apply the downward force FP to the bleed surface 214'. The material forming the manifold 210' responds to the downward force FP by deforming radially inwardly. For example, FIG. 8 shows a bulge or other contour 219' extending a radially into the reduced diameter section of the bore 212'. As indicated in FIG. 8, the bulge 219' presses radially against the poppet body 221 (e.g., against the nose 223), which may cause the poppet body 221 to stick (i.e., to maintain its position against a counteracting force). To maintain functionality of the valve arrangement after the bore side walls begin bulging, additional pressure is required to move the poppet 220 within the manifold 210.

Figure 9:
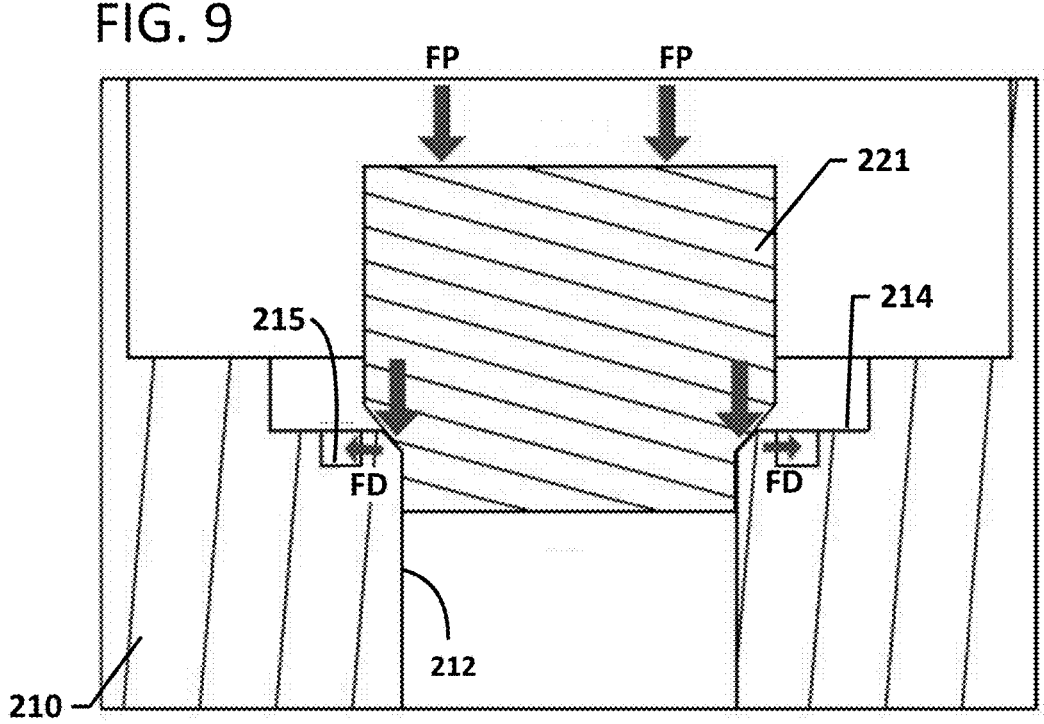
FIGS. 9 and 10 illustrate the deformation effects on the manifold of FIGS. 4-6 due to pressure exerted by the poppet.
Figure 10:
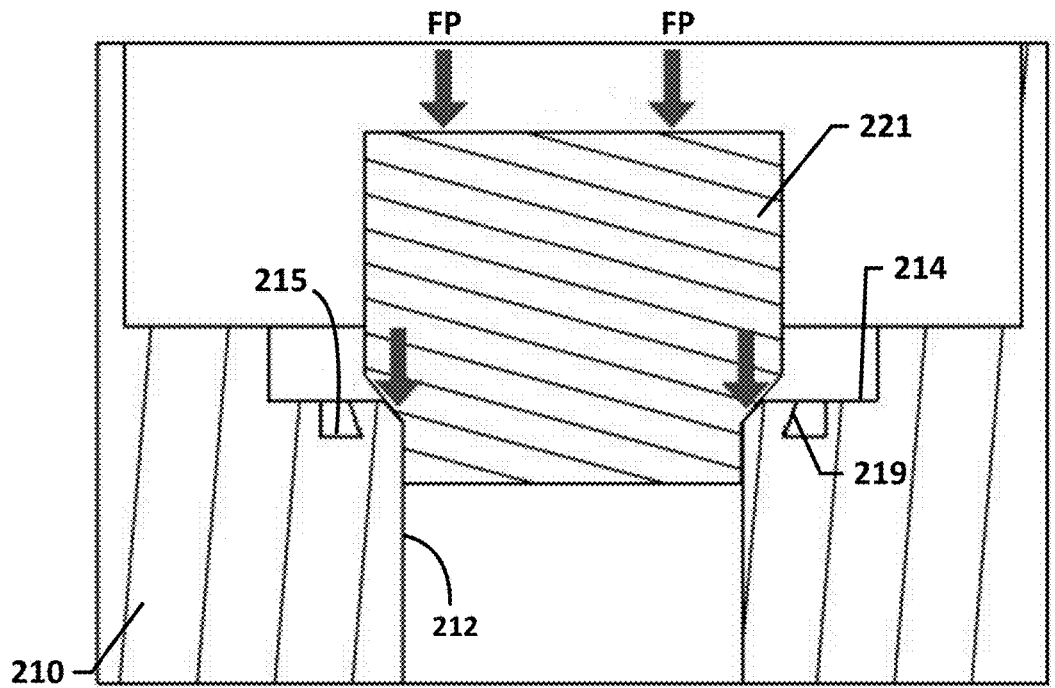

FIGS. 9 and 10 illustrate the effects of the downward force FP on a manifold 210 that does have a bleed ring 213 defined by an annular recess 215 in the bleed surface 214. The annular recess 215 provides a relief region into which the force from the poppet may be directed (e.g., see deformation force FD of FIG. 9). In particular, the annular recess 215 provides a volume into which the bleed ring 213 may deform (see FIG. 10). Because the deformation of the manifold material is guided into the annular recess 215, the side walls of the bore 212 do not bulge or contour into the bore 212. Accordingly, the manifold does not deform in a way that interferes with the movement of the poppet 220.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A hydraulic valve arrangement comprising:
a system chamber including a manifold and a poppet,
the manifold including a manifold body defining a first port and a second port leading to a bore, the manifold body defining a bleed surface that is a single/one-piece unitary integral uniform material construction with the manifold body throughout an entire body of the bleed surface as the bleed surface extends from the manifold body, the manifold defining a bleed ring that surrounds the bore and has an angled contact surface that extends between the bleed surface and the bore, the manifold body also defining an annular recess around the bleed ring that is recessed relative to the bleed surface, the annular recess having an inner radius that is radially spaced outwardly from the bore a first distance and having an outer radius that is radially spaced outwardly from the bore a second distance that is greater than the first distance, and
the poppet being slidably disposed within the bore between a plurality of positions, the poppet being structured to close a main flow path between the first and second ports when the poppet is in a first position and the poppet being structured to at least partially open the main flow path when the poppet slides away from the first position, the poppet defining an angled contact surface that is configured to engage the angled surface of the bleed ring when the poppet is in the first position;
the bleed ring being sufficiently low so that a portion of the poppet extends into the bore beyond the annular recess when the poppet is in the first position.

2. The hydraulic valve arrangement of claim 1, wherein the hydraulic valve system further comprises a pilot chamber including a pilot valve having an inlet and an outlet, the inlet of the pilot valve being in fluid communication with a variable volume region of the manifold, the variable volume region being located within the manifold relative to the first and second ports to counteract system pressure on the poppet, the pilot valve being configured to selectively drain the variable volume region of the manifold to move the poppet to a selected one of the plurality of positions, wherein the poppet defines a fluid passage extending therethrough to provide fluid communication between the variable volume region and the main flow path.

3. The hydraulic valve arrangement of claim 1, wherein the annular recess has a depth that is greater than a height of the angled contact surface of the bleed ring.

4. The hydraulic valve arrangement of claim 1, wherein the angled contact surface of the poppet differs in angle from the angled contact surface of the bleed ring.

5. The hydraulic valve arrangement of claim 4, wherein the difference in angle ranges from about 1 degree to about 5 degrees.

6. The hydraulic valve arrangement of claim 1, wherein the poppet has a greater material hardness than the manifold.

7. The hydraulic valve arrangement of claim 6, wherein the poppet is formed from hardened steel.

8. The hydraulic valve arrangement of claim 1, wherein the poppet includes a main body and a nose, wherein the angled contact surface of the poppet extends between the nose and the main body of the poppet, and wherein the nose extends into a narrowed section of the bore towards one of the ports.

9. The hydraulic valve arrangement of claim 1, wherein a depth of the annular recess ranges from about 0.02 inches to about 0.15 inches; wherein the outer radius of the annular recess ranges from about 1.4 inches to 1.7 inches; and wherein an outer radius of the bleed ring ranges from about 1.2 inches to about 1.5 inches.

10. The hydraulic valve arrangement of claim 9, wherein the depth of the annular recess ranges from about 0.025 inches to about 0.12 inches; and wherein the outer radius of the bleed ring ranges from about 1.3 inches to about 1.4 inches.

11. The hydraulic valve arrangement of claim 10, wherein the depth of the annular recess is about 0.025 inches; wherein the outer radius of the annular recess is about 1.55 inches; and wherein the outer radius of the bleed ring is about 1.35 inches.

12. The hydraulic valve arrangement of claim 10, wherein the depth of the annular recess is about 0.05 inches; wherein the outer radius of the annular recess is about 1.55 inches; and wherein the outer radius of the bleed ring is about 1.35 inches.

13. A valve manifold for use with a poppet to selectively open a fluid pathway between a first port and a second port, the valve manifold comprising:
a body defining a first opening and a second opening connected through an internal bore, the second opening not being axially aligned with the first opening, the internal bore defining a first section having a first radius and a second section having a second radius that is smaller than the first radius; and
a bleed surface that is defined by and is a single/one-piece unitary integral uniform material construction with the body throughout an entirety of the bleed surface, the bleed surface being located within the body so that hydraulic fluid flows over the bleed surface when the fluid flows between the first and second ports, the bleed surface defining an annular recess around the bore, the annular recess being recessed relative to the bleed surface, the annular recess having a depth that extends along an axis of the internal bore and the annular recess having an inner radius that is spaced at a radial offset from the bore to provide a bleed ring, the bleed ring being located between the first and second sections of the bore, and the bleed ring having an angled contact surface facing towards the bore, the bleed ring being about level with the bleed surface.

14. The valve manifold of claim 13, wherein the annular recess has a depth that is greater than a height of the angled contact surface of the bleed ring.

15. The valve manifold of claim 13, wherein the depth of the annular recess ranges from about 0.02 inches to about 0.15 inches; wherein the outer radius of the annular recess ranges from about 1.4 inches to 1.7 inches; and wherein the outer radius of the bleed ring ranges from about 1.2 inches to about 1.5 inches.

16. The valve manifold of claim 15, wherein the depth of the annular recess ranges from about 0.025 inches to about 0.12 inches; and wherein the outer radius of the bleed ring ranges from about 1.3 inches to about 1.4 inches.

17. The valve manifold of claim 16, wherein the depth of the annular recess is about 0.025 inches; wherein the outer radius of the annular recess is about 1.55 inches; and wherein the outer radius of the bleed ring is about 1.35 inches.

18. The valve manifold of claim 16, wherein the depth of the annular recess is about 0.05 inches; wherein the outer radius of the annular recess is about 1.55 inches; and wherein the outer radius of the bleed ring is about 1.35 inches.

19. A hydraulic valve arrangement comprising:
a valve manifold having a main body defining a first port and a second port leading to a bore that extends along a central bore axis, the manifold defining a main flow path that extends through the bore between the first and second ports, the manifold also defining a bleed ring that surrounds the bore and has an angled surface, the manifold also defining an annular recess around the bleed ring, the bleed ring being a single/one-piece, integral, uniform material construction with the main body of the valve manifold throughout an entirety of the bleed ring as the bleed ring extends from the manifold body; and a poppet slidably disposed within the bore and movable along the central bore axis, the poppet closing the main flow path between the first and second ports when the poppet is in a closed position and the poppet at least partially opening the main flow path when the poppet slides away from the closed position along the central bore axis, the poppet defining an angled contact surface that is configured to engage the angled surface of the bleed ring when the poppet is in the closed position, the annular recess providing relief space for allowing the bleed ring to deform outwardly from the central bore axis when the angled contact surface of the poppet engages the angled surface of the bleed ring, the annular recess having a depth such that a portion of the poppet extends into the bore beyond the annular recess when the poppet is in the closed position, the poppet defining a fluid passage extending therethrough that provides fluid communication between the main flow path and a variable volume region defined within the bore, wherein a volume of the variable volume region varies as the poppet slides along the central bore axis; and a pilot valve in fluid communication with the variable volume region for controlling movement of the poppet along the central bore axis by controlling a pressure in the variable volume region.

20. The hydraulic valve arrangement of claim 19, wherein the poppet and the main body of the valve manifold cooperate to define a variable size metering orifice for metering flow between the fluid passage defined by the poppet and the variable volume region.

21. The hydraulic valve arrangement of claim 19, wherein the poppet includes a cylindrical end portion that extends axially beyond the angled contact surface of the poppet and that fits within a reduced-diameter portion of the bore when the poppet is in the closed position, the reduced-diameter portion of the bore being cylindrical.

22. The hydraulic valve arrangement of claim 21, wherein the cylindrical end portion of the poppet extends axially past the bleed ring when the poppet is in the closed position.

23. The hydraulic valve arrangement of claim 22, wherein the cylindrical reduced-diameter portion of the bore that receives the cylindrical end portion of the poppet is defined in part by the bleed ring and in part by the main body of the valve manifold.

\* \* \* \* \*